Patented Jan. 1, 1935

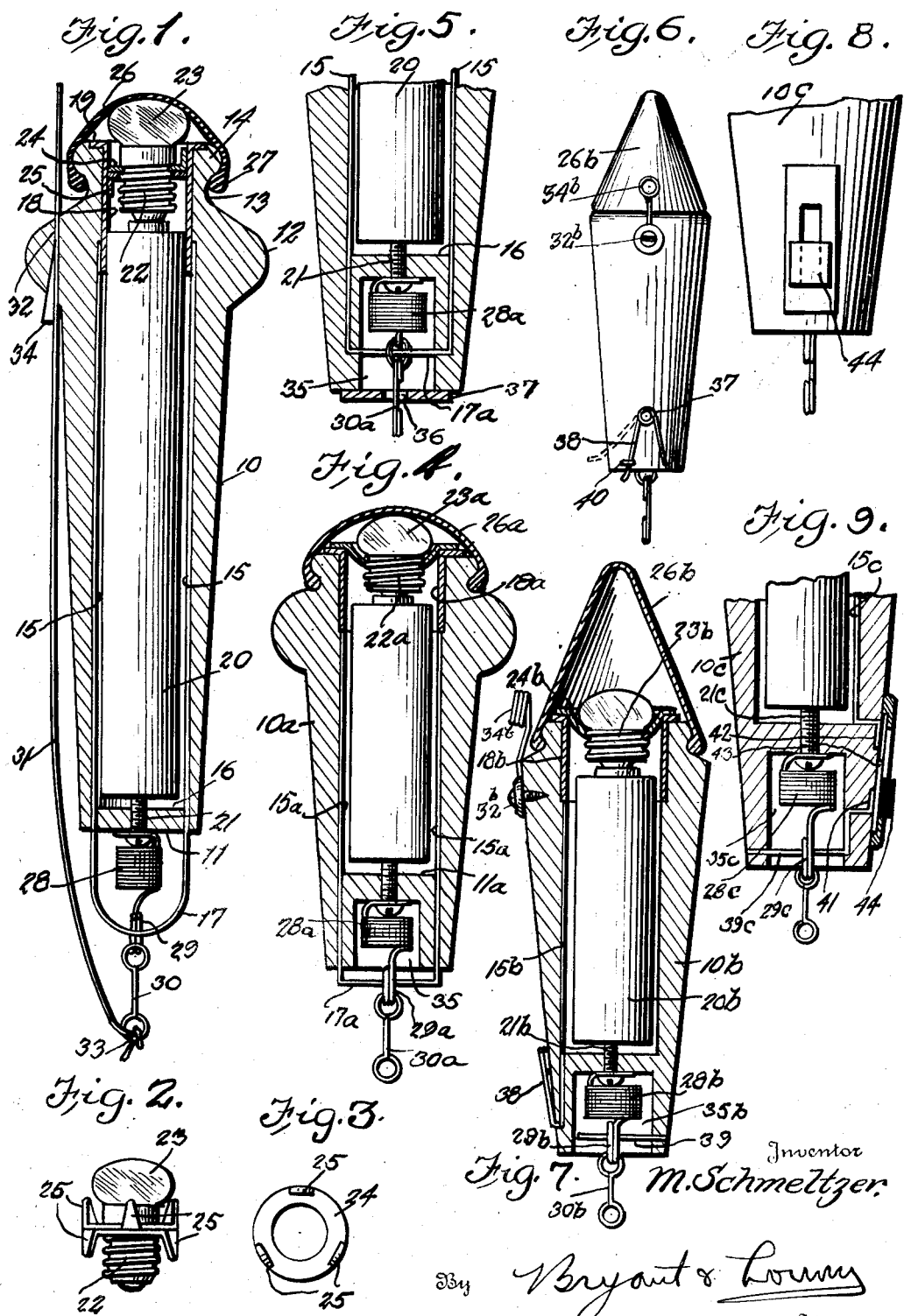

1,986,683

UNITED STATES PATENT OFFICE 1,986,683

FISHING BOB OR FLOAT

Mike Schmeltzer, East Akron, Ohio

Application August 4, 1934, Serial No. 738,511

7 Claims. (Cl. 43—17)

This invention relates to the art of fishing and particularly to bobs or floats for signalling a bite on the fish hook and being of the general type disclosed in application for patent filed by Mike Schmeltzer on September 19th, 1933, Serial No. 690,139, embodies improvements in the art thereover.

The primary object of this invention is to provide a fishing bob or float embodying an electric lamp and battery cell with a switch device operated by a bite or pull on the hook carrying the end of the fishing line and particularly to the mounting of the electric lamp in the body of the float with a removable translucent hood overlying the electric lamp and having a water-tight connection with the upper end of the float.

A further object of the invention is to provide a fishing bob or float of the foregoing character embodying novel forms of switch devices for controlling the operation of the electric lamp and to provide a control element for the switch device to render the latter inactive during daylight fishing when illumination of the lamp is unnecessary.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a longitudinal sectional view of a fishing bob or float constructed in accordance with the present invention with the new form of mounting for the electric lamp and the switch devices controlling the lamp positioned exteriorly of the lower end of the float;

Figure 2 is a side elevational vew of the electric lamp with the supporting collars therefor threaded thereon;

Figure 3 is a plan view of one of the lamp supporting collars;

Figure 4 is a longitudinal sectional view of a fishing bob or float wherein the tensioning element for the switch device is located in a pocket inwardly of the body of the float;

Figure 5 is a fragmentary longitudinal sectional view of another form of float wherein the tensioning elements of the switch devices are located within a pocket in the body of a float;

Figure 6 is a side elevational view of another form of fishing bob or float showing a looped spring contact device for controlling operation of the switch device;

Figure 7 is a longitudinal sectional view of the fishing bob or float shown in Figure 6;

Figure 8 is a fragmentary side elevational view of another form of fishing bob or float showing a slide contact member controlling operation of the switch device; and Figure 9 is a fragmentary longitudinal sectional view of the form of float shown in Figure 8.

Referring more in detail to the accompanying drawing and particularly to the form of invention illustrated in Figures 1 to 3, the fishing bob or float comprises a body portion 10 closed at its lower end as at 11, the body portion 10 tapering downwardly and having an annularly enlarged shoulder 12 adjacent its upper end forming a reduced annular groove 13 and an upper edge bead 14.

A U-shaped contact strip comprising side legs 15 is located within the socket 16 in the float body 10 with the legs engaged with the inner face of the socket and extending through the bottom wall 11 with the bight 17 of the U-shaped contact strip depending below the float body. A contact collar 18 is frictionally or otherwise mounted in the upper end of the socket 16 at the head of the float body and is flanged outwardly at its upper end as at 19 to rest upon the upper edge of the bead 14, the lower end of the contact collar 18 being engaged with the upper ends of the contact legs 15.

A battery cell 20 is received in the socket 16 and is supported at its lower end upon the contact screw 21 in spaced relation to the bottom wall 11 of the float body and the upper end of the battery cell 20 is adapted to be engaged by the terminal of the threaded base 22 of an electric lamp 23 with the lamp head disposed above the body portion 10 outwardly of the socket 16. The support for the lamp 23 to form electrical communication between the lamp and contact collar 18 includes a pair of lamp supports in the form of rings 24 that are threaded onto the threaded base 22 of the lamp 23, each ring 24 carrying right angularly directed fingers 25 at its marginal edge for wiping contact with the inner face of the contact collar 18 for the central support of the lamp within the contact collar. The supporting rings 24 are arranged back to back upon the threaded base 22 of the lamp with the fingers 25 of the two rings respectively extending in opposite directions as shown in Figures 1 and 2. A flexible translucent hood 26, preferably formed of rubber or the like encloses the upper end of the float body 10, overlying the electric lamp 23 and has the beaded edge 27 thereof positioned in the annular groove 13 inwardly of the bead 14 to provide a water-tight closure for the upper end of the float body.

The switch device for controlling illumination of the lamp 23 by the battery cell 20 includes a coil spring 28 attached at one end to the head of the contact screw 21 that projects outwardly of the bottom wall 11 of the float body, the other end of the coil spring 28 being formed into a ring 29 through which the bight 17 of the contact legs 15 extend. A link 30 is attached to the ring 29 outwardly of the bight 17. A fishing line cord 31 passes through an opening 32 in the shoulder 12 at the upper end of the float body and is attached as at 33 to the link 30, the slack in the line 31 between the link 30 and shoulder 12 being regulated by the wedge piece 34 inserted in the opening 32.

The flow of current from the battery cell 20 is through the threaded lamp base 22, supporting rings 24 to the contact collar 18 and contact legs 15, the circuit being closed upon a pull on the fishing line which moves the link 30 to cause the ring 29 to be moved into engagement with the bight 17 of the contact legs 15. The positioning of the coil spring 28 within the bight 17 affords protection for the spring. The supporting rings 24 for the lamp 23 permit sliding placement of the lamp within the contact collar 18 for engagement with the battery cell 20, frictional contact between the fingers 25 on the supporting ring 24 on the contact collar acting to hold the lamp in position insuring proper engagement between the elements.

In the form of invention illustrated in Figure 4, the float body 10a has a false bottom 11a adjacent its lower end forming a lower open ended pocket 35 in which the coil spring 28a is confined, the bight 17a of the contact legs 15a being in the form of a cross rod outwardly of and adjacent the lower end of the pocket 35. The upper end of the float body 10a receives a contact collar 18a and the threaded base 22a of the lamp 23a is received in a dished plate 24a seated on the upper end of the collar 18a, the upper end of the float body being closed by a translucent hood 26a. The lower end of the spring 28a is of ring formation as shown at 29a and through which the stirrup rod 17a passes, a link 30a being attached to the ring 29a, and to which the fishing line is attached.

A fishing bob or float similar to the form of invention shown in Figure 4 is illustrated in Figure 5, but in this latter form of the invention, the coil spring 28a and the cross rod 17a of the contact leg bight are confined in the pocket 35 at the lower end of the float body. The link 30a extends through the central opening 36 in the washer plate 37 that is secured to the lower end of the float body for closing the pocket 35.

In the form of invention illustrated in Figures 6 and 7, there is provided a manually operable element for controlling operation of the switch device, the form of fishing bob or float being similar to that shown in Figure 5, the body 10b having a single contact leg 15b located within the socket that receives the battery cell 20b, the contact leg 15b being engaged at its upper end with the contact collar 18b. The lamp 23b is supported by means of the disk 24b in contact with the battery cell and contact collar. The lower end of the contact leg 15b extends downwardly through the float body and through the side wall surrounding the pocket 35b to extend outwardly through said side wall and be formed into a spring loop 37 terminating in a leg 38. A contact rod 39 extends transversely of the pocket 35b and has one end projecting outwardly of the pocket through the side wall surrounding the same and is formed into a hook as at 40, shown in Figure 6. The contact leg 38 is illustrated in Figure 6 as engaged with the hook 40 upon the contact rod 39. A coil spring 28b confined in the pocket 35b has the upper end thereof anchored to the contact screw 21b and the other end formed into a ring 29b through which the contact rod 39 passes, a link 30b being attached to the contact ring 39b. When the contact leg 38 is engaged with the hook 40, the lamp 23b is illuminated when the circuit from the battery cell to the lamp is closed by the ring 29b moving into engagement with the contact rod 39. When it is desired to use the bob or float for daylight fishing, the leg 38 is disengaged from the hook 40 as illustrated by dotted lines in Figure 6 with the result that the lamp 23b remains inactive when the ring 29b engages the rod 39. The translucent hood 26b attached to the upper end of the float is of elongated conical formation to give increased illumination during night fishing.

Another form of control element for the switch device is shown in Figures 8 and 9, being similar to Figures 6 and 7, the float body 10c having a pocket 35c at its lower end in which the coil spring 28c is located, the same being attached at one end to the contact screw 21c while the other end thereof is formed into a ring 29c through which the contact rod 39c extends. One end 41 of the contact rod 39c is exposed at the outer side of the float body and the end 42 of the contact strip 15c is exposed at the outer side of the float body adjacent the contact end 41. A slide contact 43 operated by a button 44 bridges the contact ends 41 and 42 to permit closing of the circuit when the ring 29c moves into engagement with the contact rod 39c.

From the above detailed description of the invention, it is believed that the construction and operation thereof will at once be apparent and while there are herein shown and described the preferred embodiments of the invention, it is nevertheless to be understood that minor changes may be made therein without departing from the spirit and scope of the invention as claimed.

I claim:—

1. A fishing bob including a body having a socket therein for a battery cell, a contact screw engaged with the lower end of the cell, a contact collar in the upper end of the body, a lamp supported in contact with the contact collar and battery cell, and means for closing the circuit through the battery cell and lamp including a coil spring connected to the contact screw and carrying a ring, and a contact member extending through the ring and in communication with the contact collar adapted to be engaged by the ring for closing the circuit.

2. A fishing bob including a body having a socket therein for a battery cell, a contact screw engaged with the lower end of the cell, a contact collar in the upper end of the body, a lamp supported in contact with the contact collar and battery cell, and means for closing the circuit through the battery cell and lamp including a coil spring connected to the contact screw and carrying a ring, and a contact member extending through the ring and in communication with the contact collar adapted to be engaged by the ring for closing the circuit, the lamp support including a pair of rings threaded on the lamp base and angle fingers on the peripheral edges of the rings for frictional contact with the contact collar.

3. A fishing bob including a body having a socket therein for a battery cell, a contact screw engaged with the lower end of the cell, a contact collar in the upper end of the body, a lamp supported in contact with the contact collar and battery cell, and means for closing the circuit through the battery cell and lamp including a coil spring connected to the contact screw and carrying a ring, and a U-shaped contact member having the legs thereof extending into the body socket and engaged with the contact collar and the bight of the U-shaped contact member disposed exteriorly of the lower end of the body, extending through the ring and adapted to be engaged by the ring for closing the circuit, the lamp support including a pair of rings threaded on the lamp base and angle fingers on the peripheral edges of the rings for frictional contact with the contact collar.

4. A fishing bob including a body having a socket therein for a battery cell, a contact screw engaged with the lower end of the cell, a contact collar in the upper end of the body, a lamp supported in contact with the contact collar and battery cell, and means for closing the circuit through the battery cell and lamp including a coil spring connected to the contact screw and carrying a ring, the body having a pocket at its lower end below the socket in which the spring and ring are located and a contact member extending across the pocket and through the ring and in communication with the contact collar adapted to be engaged by the ring for closing the circuit.

5. A fishing bob including a body having a socket therein for a battery cell, a contact screw engaged with the lower end of the cell, a contact collar in the upper end of the body, a lamp supported in contact with the contact collar and battery cell, and means for closing the circuit through the battery cell and lamp including a coil spring connected to the contact screw and carrying a ring, the body having a pocket at its lower end below the socket in which the spring and ring are located and a contact member extending across the pocket and through the ring and in communication with the contact collar adapted to be engaged by the ring for closing the circuit, and a manually operable switch device forming a part of the contact member.

6. A fishing bob including a body having a socket therein for a battery cell, a contact screw engaged with the lower end of the cell, a contact collar in the upper end of the body, a lamp supported in contact with the contact collar and battery cell, and means for closing the circuit through the battery cell and lamp including a coil spring connected to the contact screw and carrying a ring, the body having a pocket at its lower end below the socket in which the spring and ring are located and a contact member extending across the pocket and through the ring and in communication with the contact collar adapted to be engaged by the ring for closing the circuit, and a manually operable switch device forming a part of the contact member including a spring loop positioned exteriorly of the body.

7. A fishing bob including a body having a socket therein for a battery cell, a contact screw engaged with the lower end of the cell, a contact collar in the upper end of the body, a lamp supported in contact with the contact collar and battery cell, and means for closing the circuit through the battery cell and lamp including a coil spring connected to the contact screw and carrying a ring, the body having a pocket at its lower end below the socket in which the spring and ring are located and a contact member extending across the pocket and through the ring and in communication with the contact collar adapted to be engaged by the ring for closing the circuit, and a manually operable switch device forming a part of the contact member including a slide contact element positioned exteriorly of the body.

MIKE SCHMELTZER.